United States Patent [19]

Matson et al.

[11] Patent Number: 5,622,744
[45] Date of Patent: Apr. 22, 1997

[54] METHOD FOR PRODUCING DENSIFIED PRODUCTS FOR AQUATIC AND ANIMAL FEED

[75] Inventors: Kenneth E. Matson, Sabetha; Ernest L. Keehn, Wetmore, both of Kans.

[73] Assignee: Extru-Tech, Inc., Sabetha, Kans.

[21] Appl. No.: 412,977

[22] Filed: Mar. 29, 1995

Related U.S. Application Data

[62] Division of Ser. No. 99,074, Jul. 29, 1993, abandoned.

[51] Int. Cl.⁶ .............................. A23K 1/10; A23K 1/18; A23L 1/326; A23L 3/015
[52] U.S. Cl. .......................... 426/623; 426/805; 426/516; 426/440; 426/450; 426/448; 426/454
[58] Field of Search .................................. 426/623, 805, 426/516, 440, 450, 448, 454

[56] References Cited

U.S. PATENT DOCUMENTS

| | | |
|---|---|---|
| 3,256,800 | 6/1966 | Halldorsson . |
| 3,642,489 | 2/1972 | Bartley ........................................ 426/69 |
| 3,685,429 | 8/1972 | McBride . |
| 3,846,562 | 11/1974 | Forkner ....................................... 426/44 |
| 3,881,024 | 4/1975 | Pahoundis, Sr. et al. ............... 426/578 |
| 3,889,007 | 6/1975 | Gunter et al. . |
| 3,934,038 | 1/1976 | Kerr ............................................ 426/2 |
| 3,934,308 | 1/1976 | Kerr . |
| 3,970,761 | 7/1976 | Wegner et al. . |
| 3,971,306 | 7/1976 | Wiese et al. . |
| 4,003,688 | 1/1977 | Mueller-Lobeck ....................... 425/465 |
| 4,042,715 | 8/1977 | Wenger et al. . |
| 4,099,455 | 7/1978 | Wenger et al. . |
| 4,138,938 | 2/1979 | Kitamura . |
| 4,328,741 | 5/1982 | Yoshikazu . |
| 4,584,024 | 4/1986 | Hisada et al. . |
| 4,981,711 | 1/1991 | Kearns et al. ........................... 426/805 |
| 5,102,671 | 4/1992 | Coles . |
| 5,128,153 | 7/1992 | Axelrod . |

*Primary Examiner*—Jeanette Hunter
*Assistant Examiner*—Choon P. Koh
*Attorney, Agent, or Firm*—Litman, McMahon and Brown, L.L.C.

[57] ABSTRACT

A product densification method for producing sinking aquatic feed, densified cattle "range cubes" or the like includes a conventional cooking extruder into which feed ingredients, including cereal grains and additives, are introduced. The feed ingredients are cooked, gelatinized and expanded in the cooking extruder to form an intermediate feed product. The intermediate feed product is then loaded onto a cooling conveyor where it is transported to a product densification unit or PDU. The PDU is a specially designed high speed, low shear extruder which is adapted to densify and shape the intermediate feed product into a final feed product which is dense enough to sink in water and stable enough to stay together for a considerable period of time while submerged or exposed to weather. The density of the sinking feed, and therefore, the sink rate thereof, can be controlled by controlling the shaft speed of the high speed screw in the PDU.

13 Claims, 3 Drawing Sheets

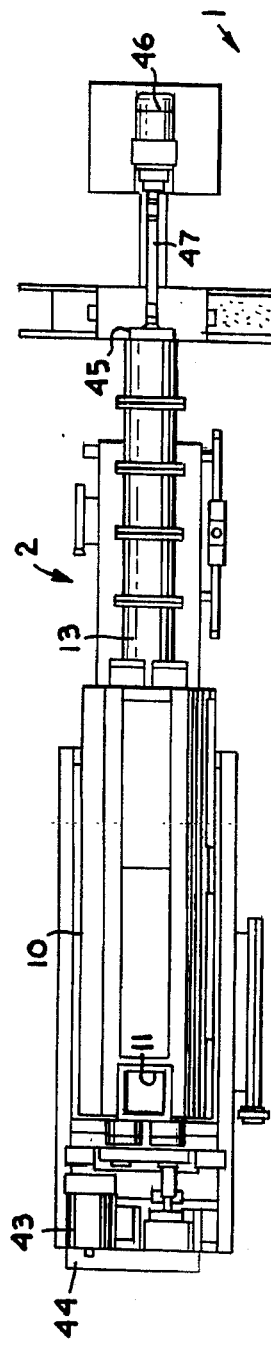
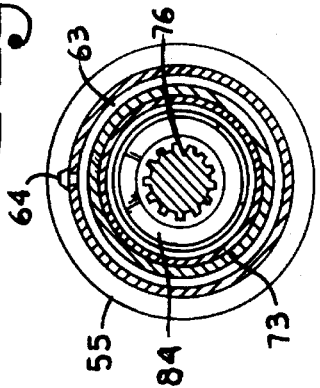
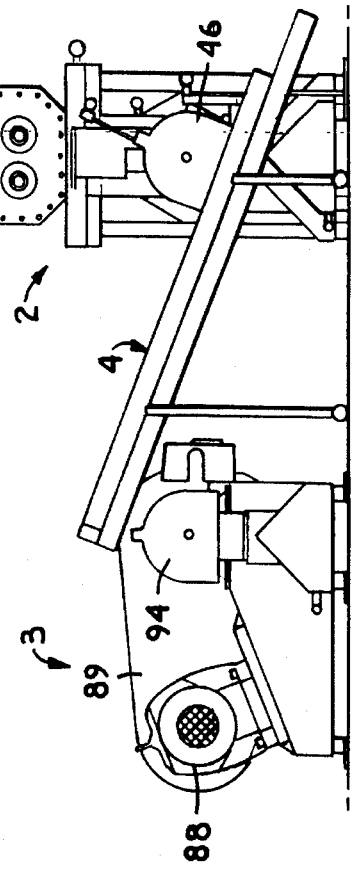

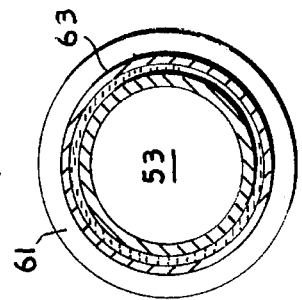
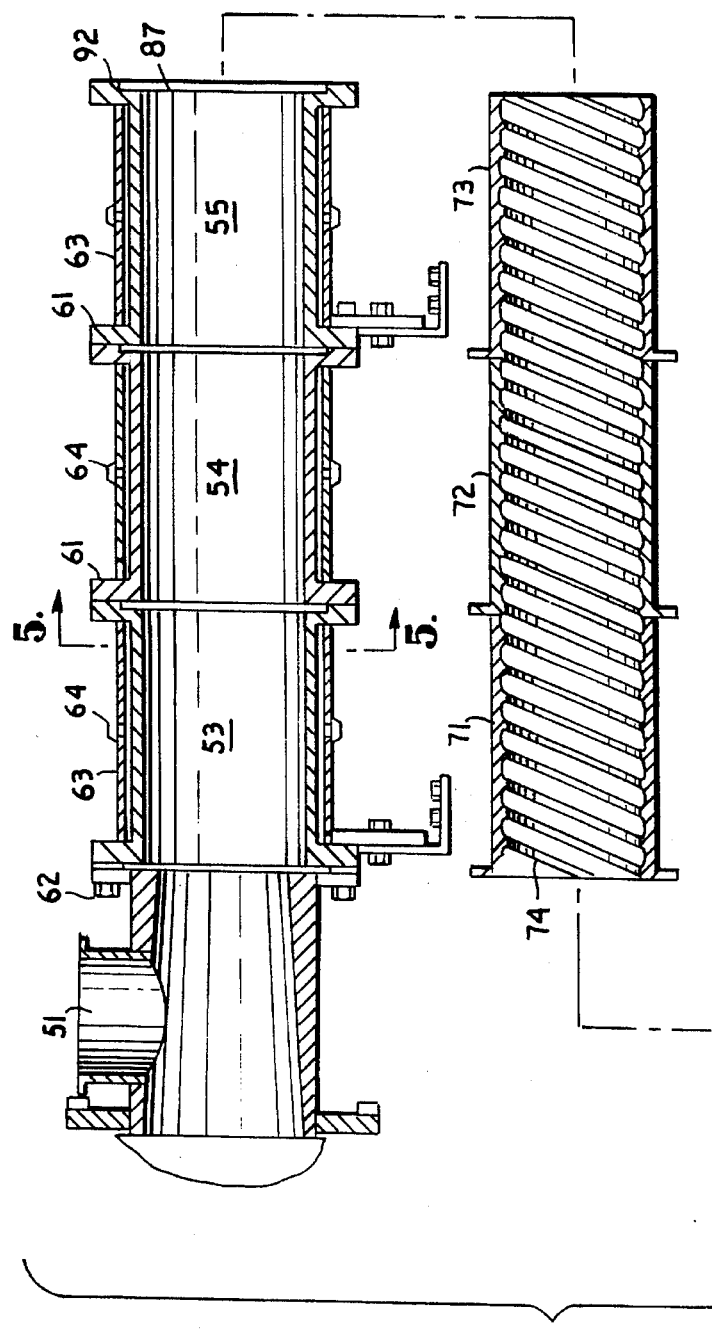
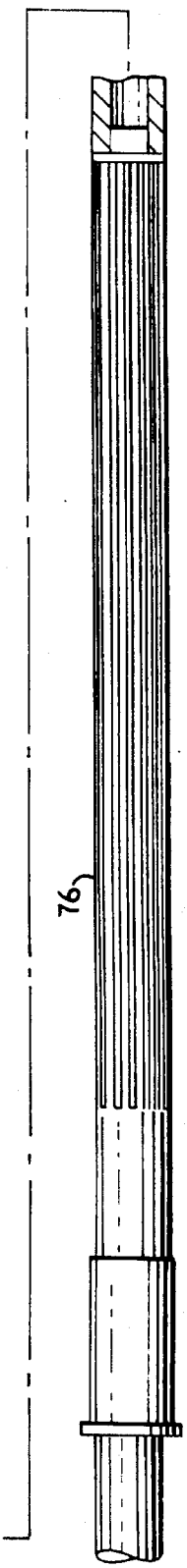

METHOD FOR PRODUCING DENSIFIED PRODUCTS FOR AQUATIC AND ANIMAL FEED

CROSS REFERENCE TO RELATED APPLICATIONS

This application is a divisional of application for U.S. patent Ser. No. 08/099,074 for PRODUCT DENSIFICATION SYSTEM AND METHOD FOR PRODUCING DENSIFIED PRODUCTS FOR AQUATIC, HUMAN AND ANIMAL FEED, filed Jul. 29, 1993, now abandoned.

BACKGROUND OF THE INVENTION

I. Field of the Invention

The invention relates to a product densification apparatus and system for producing densified feed products, such as sinking aquatic feeds, densified cattle range cubes, rodenticide pellets and the like. The system includes a cooking extruder which is designed to cook and gelatinize cereal grain and other feed formulations. The cooked feed formulations are then passed through a cooking extruder die assembly to yield an expanded feed product. The cooked and expanded feed product is then placed upon a cooling conveyor where it is transported to a specialized extruder called a product densification unit or "PDU". The PDU compresses and densifies the feed product through the use of a specially engineered barrel, die components and a high speed compression screw.

II. Description of the Related Art

Recent interest in the consumption of fish and shellfish due to their high protein and low fat content has led to the development of large scale aquatic fish farming. Catfish, shrimp, crayfish, oysters, and other seafood are now being raised using aquatic farming techniques.

While many bottom-feeding fish, such as catfish, for example, have been successfully conditioned to feed on floating fish food, this option is not available to shrimp and crayfish operations, among others. In these aquatic farming applications, sinking fish food must be utilized.

Sinking fish food has traditionally been produced by feed pellet mill operators as simply another feed product to increase their product line and provide access to additional markets with little additional investment. However, the production of sinking fish foods by traditional pellet mills involves a number of problems. Due to the limited amount of feed preconditioning and the low mechanical shear experienced by feed processed in a pellet mill, the gelatinization of starches is quite low. This makes it difficult for processed feed to properly bind as it leaves the pellet mill. This has forced manufacturers to add artificial binders to the feed stock in order to produce a sinking pellet with good water stability. Many of these artificial binders are polymer based and, therefore, are not biodegradable in water. The resultant water pollution problems have caused some countries to ban the use of these artificial binders. In addition, the relatively low gelatinization rate achieved by pellet mills has adversely affected the nutritional value of the feed. Furthermore, the amount of fat which can be introduced into the raw material prior to its introduction into a pellet mill is very limited. Lastly, it has been difficult to achieve consistent density in feed produced by pellet mills, with some "sinking" feeds produced in such mills actually floating instead.

Another widely used method of producing sinking feed is extrusion cooking. Extrusion cookers are extremely versatile. In extrusion cooking operations, a preconditioner allows the injection and uniform mixing of steam, water, fats or meat slurries, etc. into the cereal grain stock prior to its introduction into the extrusion cooker itself. The extrusion cooker uses mechanical shear, direct steam injection and pressure to cook the premixed raw materials until the desired product characteristics are obtained. Extrusion cooking is commonly used for various types of human and land animal feeds as well as floating aquatic feed. Extruder barrels and other components can be manipulated to produce a wide variety of finished feed product characteristics.

However, in producing sinking aquatic feed via cooking extrusion techniques, a specialized venting barrel segment must be added to the extruder to release the internal pressure built up during cooking. The feed product is then densified after the vented barrel segment by forcing it through a die at the end of the extruder barrel in order to achieve the density necessary for a sinking aquatic feed. Such a vented system is described in U.S. Pat. No. 4,981,711 to Kearns et al. and entitled TEXTURIZED SINKING FOOD FOR MARINE LIFE.

While achieving significantly better results than are available using traditional pellet mills, vented cooking extruders also have a number of disadvantages. Most cooking extruder operators typically produce expanded feed products, such as pet foods and floating aquatic feed, with bulk densities ranging from 24–27 lbs./ft. By contrast, sinking aquatic feed must have a bulk density of between 35–45 lbs./ft. Thus, to produce a sinking feed product, a manufacturer must make a time and labor consuming reconfiguration of the cooking extruder to add the venting barrel section, new screw components and the special die assembly. The resulting vented barrel design also limits the types of materials which can be processed into sinking feed. If high levels of gelatinization are not achieved, the raw materials will not bind properly, causing the product to discharge through the vented barrel section instead of proceeding past to the die assembly. Furthermore, when making small diameter sinking aquatic products, such as shrimp feed, die orifice sizes as small as 1.5 mm are required. When particles larger than the die orifice size reach the die, these die orifices begin to plug up, decreasing the available die open area. This can cause the product to expand, thus decreasing its bulk density. Should the bulk density become light enough to float, the extruder must be shut down so that the die orifices can be cleaned. Also, if the bulk density of the extruded product is borderline, it can be become lighter due to expansion when it is processed through a subsequent dryer/cooler unit. All of these problems result in a production rate of sinking aquatic feed for vented extrusion cookers which is considerably less than that for traditional floating feed and other expanded feed products. In addition, the demanding requirements of sinking feed production requires that an extruder operator pay considerable attention at all times to the raw material grind, product bulk density and production rate. This makes the cooking extruder an extremely operator dependent system when producing sinking feed products.

Similar problems exist in the production of any densified feed product. For example, certain animal feeds, such as cattle "range cubes" are designed to be dropped in a field or cattle feed lot where they may lie for a considerable period of time before they are consumed. Such range cubes must be very dense in order to remain intact during extended exposure to weather. Rodenticides are another example of a feed product, albeit with poison added, which must preferably be made very dense to obtain a long shelf life, remaining intact until they are consumed by a targeted rodent.

It is clear then, that the ever increasing demand for reliable, sinking aquatic feeds and other densified feed products, and the production problems inherent in existing pellet mill and vented cooking extruder systems have resulted in a need for a reliable densified feed production system. Such a system should achieve a relatively high product throughput rate while producing a uniformly dense and highly gelatinized feed product. The resulting system should not require constant monitoring of numerous critical system parameters by an operator.

SUMMARY OF THE INVENTION

The present invention is a product densification system and method for producing sinking aquatic feed, densified animal feeds, rodenticides or the like. The system includes a traditional cooking extruder for thoroughly cooking and gelatinizing cereal grains and various additives and extruding them through a conventional die to produce an expanded feed product. The expanded feed product is output from the cooking extruder onto a conveyor where it is conveyed to the input of a specialized extruder called a product densification unit or PDU. The PDU is a specially designed extruder with barrel and flat plate die components designed for a high throughput rate with minimal product shear. Due to a high speed compression screw, the PDU densifies and shapes the feed product, achieving a uniform density as high as 45 lbs/cu. ft. The combined system results in feed yields as high as two times as great as a single cooking extruder with a vented design. In addition, greater gelatinization rates and higher fat content are achievable than with either traditional pellet mills or vented cooking extruders. The PDU can be controlled by controlling the screw speed so that feed can be reliably produced which has a precise density and, therefore, a predetermined sink rate. Thus, aquatic feed can be specifically tailored for the feeding habits of a variety of aquatic species. Alternatively, other densified feed products, such as cattle range cubes of a desired density, rodenticides with a specific shelf life, etc. can be reliably produced as well.

OBJECTS AND ADVANTAGES OF THE INVENTION

The principal objects and advantages of the present invention include: to provide an improved system and method for producing sinking aquatic feed products, densified animal feeds and the like; to provide such a system and method in which a traditional cooking extruder first cooks and gelatinizes feed stock introduced via a preconditioner, which cooked and gelatinized feed stock is extruded through a conventional die to yield an expanded feed product; to provide such a system and method in which the expanded cooked and gelatinized feed product output from the cooking extruder is conveyed to a specially designed extruder called a product densification unit or PDU; to provide such a system and method in which the PDU compresses and densifies the expanded feed product via specially engineered barrel and die components and the use of a high speed compression screw; to provide such a system and method which results in much greater production speeds and greater reliability for sinking aquatic feed and other densified animal feeds than were previously available; to provide such a system and method in which sinking feed of a higher and more reliable density is consistently produced; to provide such a system and method which can be precisely controlled so as to produce a sinking feed with a predetermined sink rate; to provide such a system and apparatus which is not extremely operator sensitive; and, to provide such a system and method which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top plan view of a product densification system in accordance with the present invention.

FIG. 2 is a reduced, side elevational view of the product densification system.

FIG. 3 is an enlarged, cross-sectional view of the final PDU barrel section and die assembly, taken along line 3—3 of FIG. 2.

FIG. 4 is an enlarged, exploded view of the product densification unit, with the various screw sections illustrated in cross section.

FIG. 5 is an enlarged, cross-sectional view of the PDU barrel, taken along line 5—5 of FIG. 4.

DETAILED DESCRIPTION OF TEE INVENTION

I. Introduction and Environment

Figure 6:
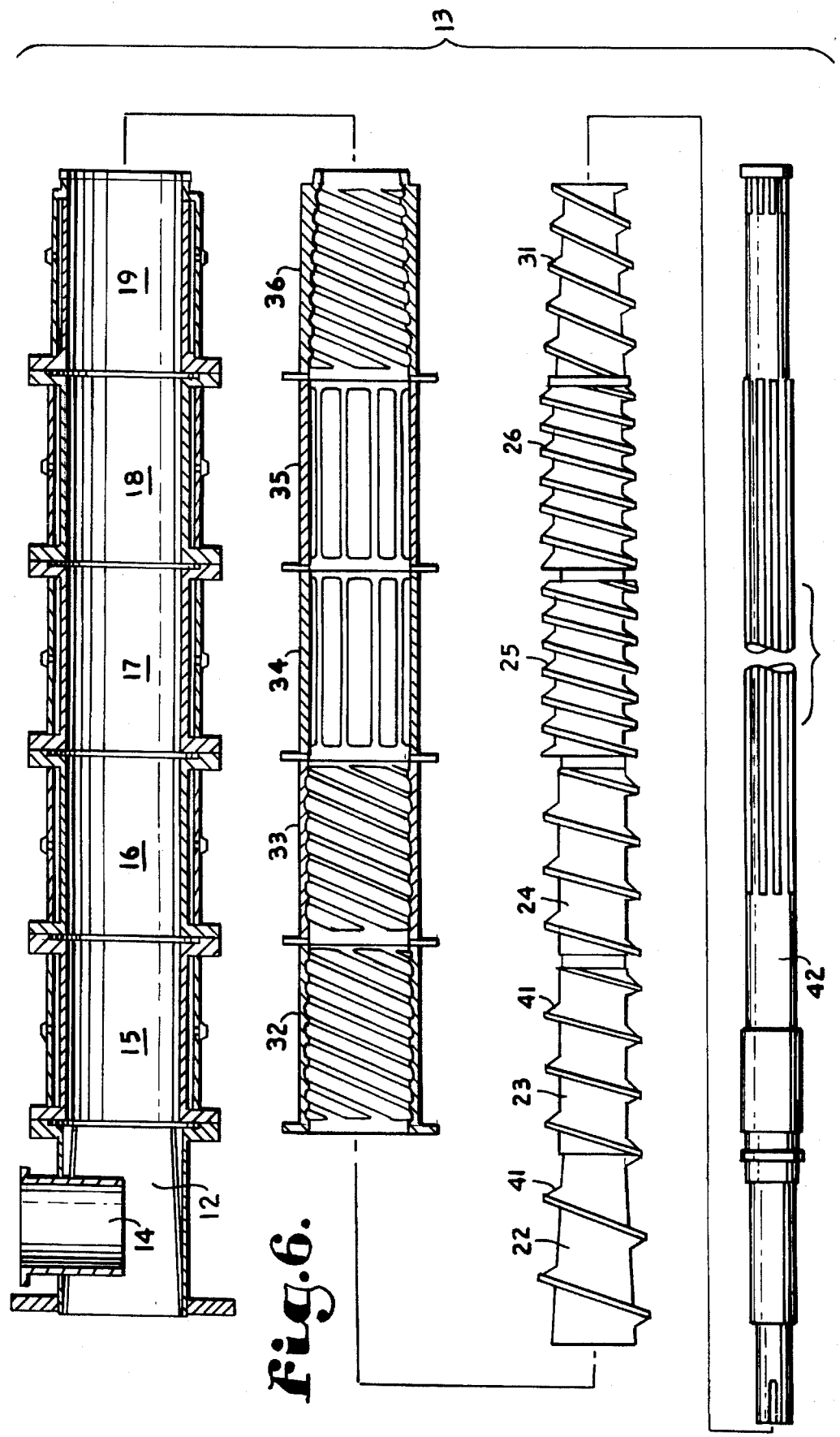
FIG. 6 is an enlarged, exploded view of the extrusion cooker.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to FIGS. 1 and 2, a product densification system, generally referenced as 1, is illustrated. The system 1 includes a cooking extruder 2 and a product densification unit or PDU 3. A conveyor 4 conveys an intermediate expanded, cooked and gelatinized feed product from the cooking extruder 2 to the PDU 3.

II. Cooking Extruder

The cooking extruder 2 comprises a preconditioning unit 10 into which feed ingredients, including cereal grains, fat, meat slurries, water, steam and other ingredients are introduced via an inlet chute 11. After the feed ingredients have been mixed and preheated in the preconditioning unit 10, they are fed into a tapered inlet barrel section 12 of a cooking extruder unit 13 (FIG. 6) via an inlet chute 14. The cooking extruder unit 13 comprises a plurality of intermediate barrel sections 15–18 and an output section 19 with a die assembly 21 positioned at the outlet end thereof. Within the inlet barrel section 12, a tapered inlet screw section 22 draws the preconditioned feed material into the extruder 13. A pair of single helical screw sections 23 and 24 are positioned in the first two intermediate barrel sections 14 and 15. A pair of double helical screw sections 25 and 26 are positioned within the intermediate barrel sections 16 and 17, respectively. Finally, a tapered helical screw section 31 is positioned in the outlet barrel section 18 to force the cooked feed material out of the die assembly 21. A plurality of sleeves 32–36 are also positioned in the barrel sections 14–18, respectively. The spiral rifling patterns in the sleeves 32 and 33 are designed to create maximum shear on the feed material by the screw sections 23 and 24. The horizontal rifling patterns of sleeves 34 and 35 are designed for maximum retention of the feed materials for cooking and gelatinization.

The barrel sections 12 and 15–19 are bolted together via flanges 37 and a steam jacket 38 surrounds each of he barrel sections 15–19. A plurality of steam injection ports 39 permit steam to be injected into the jackets 38 to heat the barrel sections 15–19.

Note that the screw sections 22–26 and 31 are designed such that the leading edges 41 are tapered away from the direction of movement of the feed material, which is to the right in FIG. 6. This causes a great deal of shear of and allows considerable slippage of the feed materials, allowing them to slip past the screw surfaces and spend a longer time in the barrel sleeve sections 32–36 in order to thoroughly cook and gelatinize the starches in the feed material. A shaft 42 extends through the screw sections 23–26 and 31 and the shaft 42 is connected to a drive motor 43 which is connected via a chain or belt drive unit 44 to turn the shaft 42 in a clockwise direction when viewed from the input end of the extruder 13.

Thus, the cooking extruder 2 is a conventional cooking extruder which cooks and gelatinizes feed ingredients in the barrel sections 15–18. The thoroughly cooked and gelatinized feed is then expanded as it is forced from the barrel section 19 through the die assembly 21, yielding a plurality of continuous streams of intermediate cooked and "puffed" feed which are then cut into small pieces 44 by a conventional, high speed cutter 45 driven by a motor 46 via a shaft 47. The pieces 44 are then dropped onto a moving belt 48 of the conveyor 4. The cooked feed 44 output from the unvented cooking extruder 2 will typically have a density of approximately 24–27 lbs/cu. ft. This is considerably less than the 35–45 lbs/cu. ft. density which is required of a sinking aquatic feed, a durable cattle range cube, a long-life rodenticide, etc.

III. Product Densification Unit

In order to achieve the requisite density of 35–45 lbs/cu. ft., the intermediate expanded feed 44 must be further densified. The feed 44 is conveyed by the conveyor belt 47 to an inlet hopper 51 in the PDU 3, through which the feed 44 enters a tapered inlet barrel section 52. A pair of intermediate barrel sections 53 and 54 and an outlet barrel section 55, respectively, are connected to the inlet barrel section 52 via a plurality of flanges 61. A plurality of through bolts 62 connect the flanges 61 to each other.

Each of the barrel sections 53–55 includes an outer steam jacket 63 and each steam jacket 63 has a steam inlet port 64 and a steam outlet port 65. Steam is circulated through the jackets 63 to heat the PDU 3. A plurality of sleeves 71–73 are inserted into the barrel sections 53–55, respectively, with each sleeve including a spiral rifling pattern 74. Each of the barrel sections 53–55 and the sleeves 71–73 are of approximately the same diameter.

A high speed pusher screw assembly 75, driven by a drive shaft 76 includes a helical intake screw section 81, a pair of intermediate pusher screw sections 82 and 83, and a final outlet screw section 84. In each of the screw sections 81–83, the leading edges 85 of the screw blades are oriented generally vertically, which orientation yields a powerful pushing force on the feed material with minimal shear effects and very little slippage. The outlet screw section 84 has narrower, more upright blades 86, which provide maximum pressure at a flat plate die assembly 87. A drive motor 88 (FIG. 1) drives the shaft 76 via a chain or belt drive 89.

The die assembly 87 is positioned in an outlet end 92 of the outlet barrel section 55. The die assembly 87 is a simple flat plate die with aperture sizes designed to accommodate the particular feed requirements of a predetermined aquatic species. For example, for shrimp feed, a die orifice size of approximately 1.5 mm in diameter is required. Of course, cattle range cubes and rodenticides will have a much larger diameter, e.g. on the order of 0.5 inches or greater for the range cubes.

A conventional high speed cutter 93, driven by a motor 94 via a shaft 95, is positioned near the output end 92 of the PDU 3 to chop the streams of extruded feed exiting the PDU 3 into pellet-sized feed chunks which are then dried and weighed in preparation for shipping.

IV. Operation

Feed ingredients, including cereal grains, fat, molasses, water and steam, are introduced into the preconditioner 10 via the chute 11. The feed ingredients are preconditioned therein by mixing and heating, and the preconditioned and mixed feed ingredients are introduced into the cooking extruder 13 via the chute 14. Intake screw section 22 draws the preconditioned feed ingredients into the barrel section 15, where they are pulled along via screw sections 23–26 as they are being cooked by steam injected into the steam jackets 38 via the ports 39. The steam heat, plus the high shear forces created by the screw sections 23–26, thoroughly cook and gelatinize the feed ingredients. In the final barrel section 19, the cooked and gelatinized feed is expanded or "puffed" as it is forced through the die 21, with exiting feed having a density of approximately 23–27 lbs./cu. ft.

At this point, the ejected streams of cooked and gelatinized feed are cut by the cutter 45. Should the feed be needed for floating aquatic marine food, for example, or for conventional pet or livestock feed, it can be dried and bagged for shipment at this point. However, if sinking aquatic food is desired, or if other densified products, such as cattle range cubes are desired, the feed must be densified to a density of 35–45 lbs./cu. ft. Thus, the cut feed pellets 44 are conveyed via the conveyor belt 47 and introduced into the PDU 3 via the intake chute 51. It should be pointed out that the cutter 45 is optional, and that continuous streams of expanded feed 44 can be conveyed to the PDU 3, if desired.

The feed 44 is drawn into the PDU 3 via the tapered intake screw section 22, and it is densified to a density of approximately 35–45 lbs/cu. ft. by the constant diameter, pushing screw sections 23–25. Internal pressures within the PDU 3 range from 200 to 400 psig. Speeds of the shaft 76 can range from 100 to 250 RPM.

The density of the resulting densified feed product can be varied by varying the speed of the shaft 76. Thus, sinking feed can be tailored to sink at a predetermined rate. The densified feed is made lighter by increasing the shaft speed, thereby expanding the product at the die 87. Density ranges from 35 to 45 lbs./cu. ft., depending upon feed content, have been achieved by varying the shaft speed in this range.

It is to be understood that while certain forms of the present invention have been illustrated and described herein, it is not to be limited to the specific forms or arrangement of parts described and shown.

What is claimed and desired to be secured by Letters Patent is as follows:

1. A method of preparing compressed densified feed products selected from the group consisting of a sinking aquatic feed product and a densified cattle range cube product comprising the steps of:
   (a) preconditioning a plurality of feed ingredients by mixing them and subjecting them to heat;
   (b) cooking, gelatinizing and expanding said preconditioned feed ingredients by extruding them through a cooking extruder equipped with a high shear screw to produce an expanded cooked and gelatinized feed product;
   (c) transferring said expanded cooked and gelatinized feed product to a product densification unit (PDU) which is physically separate from said cooking extruder, said PDU comprising a high speed, low shear extruder; and
   (d) densifying said expanded feed at high speed through said product densification unit by forcing said expanded feed through said PDU at high pressure and high speed via a high speed, low shear screw to produce a compressed and densified feed product which is dense enough to reliably sink in water.

2. The method of claim 1, wherein said extruding step includes:
   (a) extruding said expanded feed through said product densification unit at a pressure of from 200–400 psig.

3. The method of claim 1, wherein said extruding step includes:
   (a) extruding said expanded feed through said product densification unit at a screw speed of from approximately 100–250 RPM.

4. The method of claim 1, wherein said extruding step includes:
   (a) forcing said expanded feed through a flat plate die in said product densification unit, said flat plate die having orifices sized to produce a desired feed diameter.

5. The method of claim 1, wherein said transferring step includes:
   (a) conveying said expanded feed from said cooking extruder to said product densification unit on an open air conveyor.

6. The method of claim 1, wherein said method further includes the step of:
   (a) controlling the density of, and therefore the sink rate of said sinking aquatic feed by varying the speed of rotation of said high speed screw in said product densification unit.

7. A dense, sinking aquatic feed product with a density of from 35–45 lbs./cu. ft., said feed product being prepared by a process comprising the steps of:
   (a) preconditioning a plurality of aquatic feed ingredients by mixing them and subjecting them to heat;
   (b) cooking, gelatinizing and expanding said preconditioned feed ingredients by processing them through a cooking extruder equipped with a high shear screw to produce an expanded cooked and gelatinized feed product;
   (c) transferring said expanded cooked and gelatinized feed product to a high speed, low shear extruder which is physically separate from said cooking extruder; and
   (d) extruding said expanded feed via a high speed, low shear compression screw through said high speed, low shear extruder to produce said sinking aquatic feed product.

8. A sinking aquatic feed product as in claim 7, wherein said process further comprises the step of:
   (a) varying the speed of said high speed compression screw to control the density of the sinking aquatic feed product.

9. A dense cattle range cube feed product with a density of from 35–45 lbs./cu. ft., said feed product being prepared by a process comprising the steps of:
   (a) preconditioning a plurality of cattle feed ingredients by mixing them and subjecting them to heat;
   (b) cooking, gelatinizing and expanding said preconditioned feed ingredients by processing them through a cooking extruder equipped with a high shear screw to produce an expanded cooked and gelatinized feed product;
   (c) transferring said expanded cooked and gelatinized feed product to a high speed, low shear compression extruder which is physically separate from said cooking extruder; and
   (d) extruding said expanded feed via a high speed compression screw through said high speed, low shear extruder to produce said cattle range cube feed product.

10. A dense cattle range cube feed product as in claim 9, wherein said process further comprises the step of:
    (a) varying the speed of said high speed compression screw to control the density of said range cubes.

11. A method of preparing a sinking aquatic feed product, a densified cattle range cube product or the like comprising the steps of:
    (a) preconditioning a plurality of feed ingredients by mixing them and subjecting them to heat;
    (b) cooking, gelatinizing and expanding said preconditioned feed ingredients by extruding them through a cooking extruder equipped with a high shear screw to produce an expanded cooked and gelatinized feed product;
    (c) transferring said expanded cooked and gelatinized feed product to a high speed, low shear extruder which is physically separate from said cooking extruder by conveying said expanded feed from said cooking extruder to said product densification unit on an open air conveyor; and
    (d) densifying said expanded feed at high speed through said high speed, low shear extruder via a high speed, low shear compression screw at a screw speed of between 100–250 RPM and at a pressure of between 200–400 psig. to produce a compressed and densified feed product, said densified feed product having a density in the range of 35–45 lbs/cu. ft.

12. The method of claim 11, wherein said extruding step includes:
    (a) forcing said expanded feed through a flat plate die in said high speed, low shear extruder, said flat plate die having orifices sized to produce a desired feed diameter.

13. The method of claim 11, wherein said method further includes the step of:
    (a) controlling the density of said feed product by varying the speed of rotation of said high speed screw.

* * * * *